May 28, 1957     J. W. BANCROFT     2,793,529
FLUID QUANTITY MEASURING APPARATUS
Filed Aug. 28, 1950
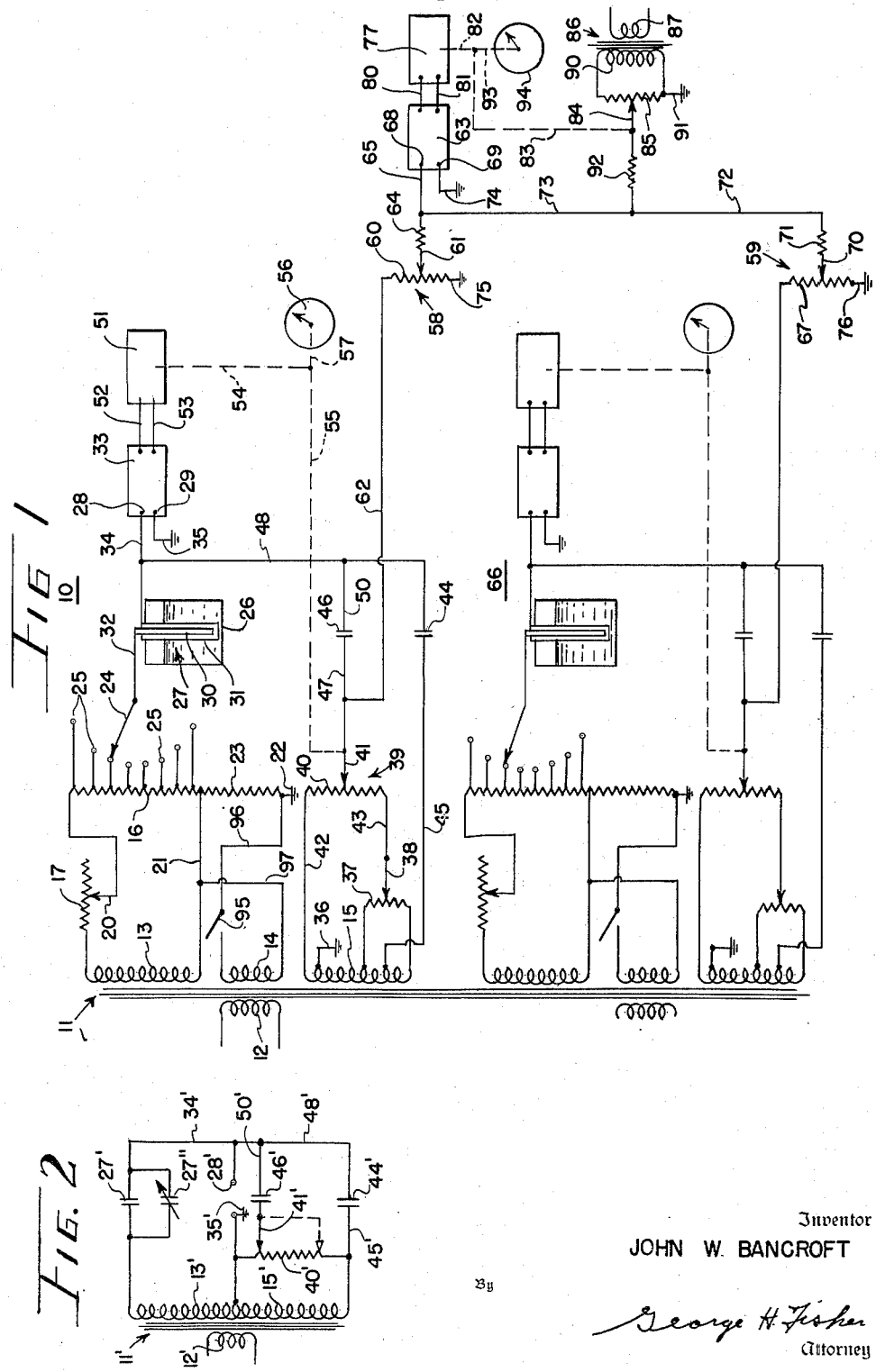
Inventor
JOHN W. BANCROFT
George H. Fisher
Attorney

United States Patent Office 2,793,529
Patented May 28, 1957

2,793,529

FLUID QUANTITY MEASURING APPARATUS

John W. Bancroft, Minneapolis, Minn., assignor to Minneapolis-Honeywell Regulator Company, Minneapolis, Minn., a corporation of Delaware Application August 28, 1950, Serial No. 181,747

3 Claims. (Cl. 73—304)

This invention is concerned primarily with apparatus for measuring the quantity of fuel in a tank and more particularly with apparatus capable of producing signals which may be totalized to give a total indication of the quantity of fuel in a plurality of tanks. It is therefore an object of this invention to provide new and improved fuel measuring apparatus capable of deriving signals which may be totalized.

Another object of the invention is to provide a new and improved capacitance measuring type of fuel measuring apparatus capable of deriving such fuel quantity signals from individual tanks as are capable of being totalized.

Another object of the invention is to provide a capacitance measuring type of fuel quantity measuring apparatus in which the signal due to the fixed, or empty tank, capacitance value of the tank unit, which is the capacitor the capacitance of which varies with quantity of fuel in the tank, is neutralized by a signal due to a fixed capacitor in the circuit.

Another object of the invention is to provide a capacitance measuring type of fuel quantity measuring apparatus in which the signal from the variable portion only of the capacitance of the tank unit is compared with a variable signal from another capacitor.

Another object of the invention is to provide a capacitance measuring type of fuel quantity measuring apparatus for individual tanks in which the signal from the capacitor which is compared with the variable signal of the tank unit is varied upon a difference between the two signals to reduce the difference to zero so that the potential across the comparing capacitor is an indication of the quantity of fuel in the individual tank and may be added to other similar signals to obtain an indication of the total quantity of fuel in a number of tanks in a system.

To learn how these and other objects and advantages are obtained, reference is had to the following detailed description taken in conjunction with the accompanying drawing in which:

Figure 1 is a diagram of the apparatus comprising the invention; and

Figure 2 is a simplified diagram of a portion of the apparatus showing how the signals from the various capacitors balance each other.

In the diagram of Figure 1 a sensing apparatus, hereafter to be called the bridge 10, is shown to have a transformer 11 comprising a primary 12 and three secondaries 13, 14, and 15. Transformer secondary 13 has its upper terminal connected to the upper terminal of a tapped resistor 16 through a variable resistor 17, the wiper arm 20 of the variable resistor 17 being shown to be connected to the upper terminal of the tapped resistor 16. The lower terminal of tapped resistor 16 is connected to the lower terminal of transformer secondary 13 through a conductor 21. The lower terminal of tapped resistor 16 is also connected to ground terminal 22 through a resistor 23. A wiper arm 24 operates in cooperation with taps 25 on the resistor 16.

A tank 26 has a capacitive tank unit 27 positioned therein. The tank unit 27 has an inner electrode 30 and outer electrode 31. The inner and outer electrodes combine to form a capacitor, the capacitance of which varies as the height of the liquid changes. For best results the capacitance should vary linearly with change in liquid quantity. This is because the dielectric constant of the liquid is greater than that of air and so the higher the liquid level rises between the electrodes the greater the capacitance of the tank unit. A typical capacitor tank unit of this type is shown in a Griffith Patent 2,563,281 and assigned to the same assignee as the present invention. The wiper arm cooperating with the taps along resistor 16 is connected to the inner electrode 30 through a conductor 32. The outer electrode 31 of the tank unit is connected to an input terminal 28 of an amplifier 33 through a conductor 34. The other input terminal 29 of amplifier 33 is connected to ground terminal 35. While tank 26 is shown merely as a conventional tank, it is to be understood that it may be the fuel container of an aircraft.

Transformer secondary 15 is connected near its upper terminal to a ground terminal 36. A potentiometer having a resistor 37 and a wiper arm 38 is connected across a portion of transformer secondary 15 near its bottom end. The lower terminal of resistor 37 is connected to the lower terminal of transformer secondary 15 while the upper terminal of resistor 37 is connected to a point on transformer secondary 15 between the lower terminal and ground. A second potentiometer 39 having a resistor 40 and a wiper arm 41 is connected between the upper terminal of transformer secondary 15 and wiper arm 38 by conductors 42 and 43.

One terminal of a capacitor 44 is connected by means of a conductor 45 to transformer secondary 15 at approximately the mid-point of that portion of secondary 15 across which resistor 37 is connected. The other terminal of capacitor 44 is connected to input terminal 28 of amplifier 33 through conductors 48 and 34. The wiper arm 41 of potentiometer 39 is connected to one terminal of a capacitor 46 through conductor 47. The other terminal of capacitor 46 is connected to the input terminal 28 of amplifier 33 through conductors 50, 48, and 34.

It is thus seen that transformer secondaries 13 and 15 combine to form a power source for a bridge network which has as a first arm thereof a portion of the tapped resistor 16 and resistor 23. A second arm of the bridge comprises the portion of resistor 40 which is between ground potential and the lower terminal of the resistor. A third arm of the bridge comprises tank unit 27. The fourth arm of the bridge is composed of capacitors 44 and 46 essentially in parallel. The signal voltage output from the bridge is taken from between conductor 34 and ground.

A better understanding of the operation of this bridge may perhaps be found by a study of the diagram of Figure 2 which is a simplified form of the bridge 10. In the diagram of Figure 2, transformer 11' has a primary 12' and a single secondary divided into two halves, 13' and 15'. The tank unit has been shown to be composed of two capacitors 27' and 27" connected in parallel. One terminal of each of the two capacitors 27' and 27" is connected to the upper terminal of transformer secondary portion 13' while the other terminal of each of the two capacitors is connected to an output terminal 28' of the bridge through a conductor 34'. The center tap between transformer secondary portions 13' and 15' is connected to a ground terminal 35'.

A resistor 40' is connected across secondary portion 15'. Resistor 40' has a wiper arm 41' cooperating therewith. The lower terminal of secondary portion 15' is connected through a conductor 45' to one terminal of a capacitor 44', the other terminal of which is connected to output terminal 28' through conductor 48'. The wiper arm 41' is connected to one terminal of a capacitor 46', the other terminal of which is connected through conductors 50' and 48' to output terminal 28'. Thus it is seen that the output signal voltage from this bridge shown in Figure 2 is between ground terminal 35' and terminal 28'.

Capacitor 27' is representative of the capacitance of the tank unit when there is no fuel in the tank and may be known as the empty tank capacitance. The variable capacitor 27'' is representative of the variation of capacitance of the tank unit for change in the level of fuel in the tank. Capacitor 44' may have a capacitance value equal in magnitude to the capacitance of capacitor 27'. Thus when the voltages across capacitors 27' and 44' are equal and opposite, the current flows through these two capacitors are cancelled out and do not affect the signal output from the bridge.

Capacitor 46' is fixed in magnitude but the voltage across this capacitor may be varied by moving the wiper arm 41' along resistor 40'. Thus, when wiper arm 41' is at the upper end of resistor 40' there is no voltage across capacitor 46' and thus there is no current flow attributable to the capacitance and the voltage across the capacitor 46'. When the wiper arm 41' is at the lower end of resistor 40' the entire voltage across transformer secondary 15' is across the capacitor 46' and a maximum signal current through capacitor 46' results.

The voltage across capacitor 27'' is fixed but the capacitance value of the capacitor varies from zero, when there is no fuel in the tank, to a maximum value when the tank is full.

By giving an arbitrary designation of $E_1$ to the voltage across capacitor 27'' and an arbitrary designation of $C_1$ to the capacitance of capacitor 27'' and likewise designations of $E_2$ and $C_2$ for the voltage across capacitor 46' and the capacitance of capacitor 46' it can be seen that when $E_1C_1=E_2C_2$ the bridge balances. With $E_1$ and $C_2$ constant, if $C_1$ should vary it is then necessary to vary $E_2$ to cause the bridge to be rebalanced.

As seen in Figure 1, the output terminals of bridge 10 are connected to the input terminals 28 and 29 of amplifier 33 through conductor 34 and ground terminals 22, 36 and 35. Amplifier 33 then energizes the motor 51 through conductors 52 and 53. Motor 51 has mechanical output connection 54 and 55 to wiper arm 41 moving along resistor 40. When there is a signal output from the bridge 10, amplifier 33 is energized to cause an operation of motor 51 to move wiper arm 41 along resistor 40 to reduce the signal output from the bridge to zero.

Motor 51 is also mechanically connected to indicator dial 56 by means of mechanical connections 54 and 57.

The bridge 10 is calibrated as follows:

Variable resistor 17 and tapped resistor 16 are known as the empty tank calibration resistors. With the tank empty, and wiper arm 41 positioned at the ground potential along resistor 40 so that no signal from capacitor 46 will enter in the system, the signal from capacitor 44, connected across almost all of transformer secondary 15 is balanced out by the signal from tank unit 27 connected across a portion of transformer secondary 13. This is done by moving wiper arm 24 along the taps 25 on resistor 16 until the signal is reduced to a very low value. Wiper arm 20 is then moved along resistor 17 until the currents through the capacitor 44 and the tank unit 27 balance each other out. The bridge is then calibrated for empty tank unit capacitance. The needle on dial 56 is positioned at zero value to indicate no fuel in the tank.

To calibrate the bridge for full tank unit capacitance the tank is filled with fuel and the wiper arm 41 moved to the bottom terminal of resistor 40 by motor 51. The wiper arm 38 is then moved along resistor 37 until the current through capacitor 46, added to the current through capacitor 44, exactly balances the current through tank unit 27 and there is no signal voltage output from the bridge. The needle on dial 56 is then at maximum and the dial may be calibrated between the zero and full values in pounds of fuel.

A test circuit for determining whether or not the apparatus is operating satisfactorily is also included in the bridge. Transformer secondary 14 has its upper terminal connected to ground terminal 22 through a normally open switch 95 and a conductor 96. The lower terminal of transformer secondary 14 is connected to the lower terminals of tapped resistor 16 and transformer secondary 13 through conductor 97. The voltage drop across resistor 23 is normally quite small though of opposite phase to the voltage drop across resistor 16.

When the apparatus is tested for satisfactory operation by closing the test switch 95, however, the voltage across transformer secondary 14 is impressed across resistor 23 with the voltage being of opposite phase to the voltage across resistor 16. Thus, if the secondaries 13 and 15 have 67 volts induced in them and secondary 14 has 30 volts induced in it the potential of the lower terminal of resistor 16 is 30 volts on one side of ground potential with the potential of the upper terminal of the resistor 16 thus being reduced to only 37 volts on the other side of ground potential. The voltage on wiper arm 24 is changed by almost 30 volts and therefore the signal current through tank unit 27 is greatly reduced or even caused to flow in the opposite direction.

The bridge is unbalanced in the empty tank direction and the pointer on dial 56 is rapidly moved toward the zero end of the dial as the bridge rebalances itself to this new condition.

When the test switch 95 is released the potentials on resistor 16 immediately assume their normal values with respect to ground potential and the network rebalances itself to give a correct indication of the amount of fuel in the tank.

If there should be something wrong in the amplifier, where the greatest possibility of the malfunction lies, an unbalance of the bridge would not cause operation of the amplifier, and thus the motor, to move the pointer along dial 56. Closing the test switch 95 then would not have any effect on the pointer and it would be immediately evident that something was wrong with the apparatus.

The reason for connecting one terminal of capacitor 44 above the end of transformer secondary 15, and connecting a potentiometer across the bottom portion of the secondary 15 is to enable manual adjustments to be made to calibrate for various types of fuel which have different dielectric constants.

Let it be assumed, for example, that the dielectric constant for a particular fuel is 2.0. The dielectric constant of air is 1.0 and so the difference between the dielectric constants of the fuel and air would be 1.0. In such a situation, for a full tank the capacitance of the capacitors 27' and 27'', shown in Figure 2, would be equal. Because the current through capacitor 44' exactly balances out the current through capacitor 27', the current through capacitor 27'' must be balanced out by the current through capacitor 46'. Thus, in solving the equation $C_1E_1=C_2E_2$, if the capacitance 46' is equal to the maximum capacitance of capacitance 27'' the voltage across capacitor 46' must equal the voltage across capacitor 27''. It is therefore seen that because the voltages across capacitors 27'', 27' and 44' are the same the voltage across the capacitor 46' must be the same as the voltage across capacitor 44'.

If now the dielectric constant of fuel should increase a greater capacitance, and thus a larger product of $C_1E_1$ would result from capacitor 27''. Because the capacitance of capacitor 46' is fixed it means that the voltage across capacitor 46' must be increased to satisfy the equation $C_1E_1=C_2E_2$. This means that the voltage across capacitor 46' must be greater than the voltage across capacitor 44'. Therefore resistor 37 is placed across a portion of the transformer secondary 15 so that if the dielectric constant of the fuel is greater than 2.0 the wiper arm 38 may be moved downwardly along the resistor 37 so that a greater maximum voltage may be placed across capacitor 46 than across capacitor 44. Likewise, if the dielectric constant of the fuel should be less than 2.0 the wiper arm 38 is moved upwardly along resistor 37 so that the maximum voltage across capacitor 46 cannot become as great as the voltage across capacitor 44.

It can be seen from the above description that the potential between wiper arm 41 and ground must be an indication of the amount of fuel in the tank. This is because when the network is balanced the input to amplifier 33 is zero, meaning that terminal 28 is at ground potential. The voltage on wiper arm 41 is then the voltage across capacitor 46, which is an indication of the amount of fuel in the tank. This voltage may then be used to be added to other voltages of like nature to obtain an indication of the total amount of fuel in a number of tanks. This is accomplished as follows:

The potential on wiper arm 41 is impressed across a potentiometer 58 having a resistor 60 and a wiper arm 61 by means of a conductor 62. The wiper arm 61 is connected to an input terminal 68 of an amplifier 63 through a summing resistor 64 and a conductor 65. The other input terminal 69 of amplifier 63 is connected to ground terminal 74.

A network 66 for obtaining a signal indication of the quantity of fuel in a second tank is identical in construction and operation as the apparatus previously described and therefore a description of the construction and operation of the apparatus 66 will not be gone into. The output voltage from the apparatus 66, which indicates the quantity of fuel in the second tank, is impressed across a potentiometer 59 having a resistor 67 and a wiper arm 70. The wiper arm 70 of this potentiometer is connected to the input terminal 68 of amplifier 63 through a summing resistor 71 and conductors 72, 73 and 65. The lower terminals of the resistors 60 and 67 are connected to ground terminals 75 and 76 respectively. It is thus seen that the signal voltages from the various networks are added together in parallel.

The signal voltages from the various bridge circuits are impressed across potentiometers rather than connecting the bridge circuits directly to the input circuit of the amplifier through current limiting resistors in order that networks obtaining individual fuel quantity signals from tanks of various sizes may be used. Thus, if the tank 26 were to hold twice as much fuel as the tank in network 66 the wiper arm 61 would be positioned twice as far up along resistor 60 from ground terminal 75 as wiper arm 70 would be positioned along resistor 67 from ground terminal 76. If all the tanks were to hold the same maximum quantity of fuel there would, of course, be no necessity for using potentiometers. Obviously, it is possible to add voltages from more than two networks and impress the resultant voltage upon the input circuit of the amplifier 63. The principle, of course, remains the same.

Amplifier 63 energizes a motor 77 through conductors 80 and 81. Motor 77 is connected through mechanical connection 82 and 83 to a wiper arm 84 along a resistor 85. The resistor 85 is connected across a transformer secondary 90 of a transformer 86, which also has a primary 87. The lower terminal of resistor 85 is connected to a ground terminal 91. The wiper arm 84 is connected to the input terminal 68 of amplifier 63 through summing resistor 92 and conductors 73 and 65 and so is algebraically in parallel with the signals from the various individual fuel quantity networks. The purpose of this potentiometer circuit is to derive a voltage which will be of opposite phase to the voltages from the bridge 10 and the network 66 so as to reduce the signal to amplifier 63 to zero and thus obtain a null balance apparatus. Thus, when there is no change in the quantity of fuel in any of the networks, amplifier 63 will not be energized and motor 77 will not operate. Motor 77 is also connected by mechanical connection 82 and 93 to a pointer on a dial 94 to indicate the total quantity of fuel in the tanks.

It is seen that apparatus has been described wherein the empty tank capacitance value of the tank unit has been balanced by a fixed capacitor so that the only remaining signal is that signal which results from the amount of fuel in the tank. This signal has been balanced out by a further signal from a further capacitor with the voltage across the further capacitor being an indication of the quantity of fuel in the tank. It has been shown how these signals may be added together to obtain a total fuel quantity signal and indication for a number of tanks. Obviously, the apparatus described is not limited to measurement of fuel but may be used for measurement of any liquid or other substance the dielectric constant of which differs from that of air.

Because various modifications may be made by those skilled in the art without departing from the spirit of the invention it is to be understood that the invention is to be limited only to the extent of the appended claims.

I claim as my invention:

1. Capacitance type fluid measuring apparatus for indicating the quantity of a dielectric fluid in each of a plurality of containers, and for indicating the total quantity of fluid in the plurality of containers, comprising in combination: a plurality of networks one of which is associated with each container and comprises a measuring condenser having spaced electrodes immersible in the fluid in its associated container and constructed and arranged with respect to the associated container such that its capacity is a function of both the volume and dielectric constant of the fluid in the associated container; an empty tank balancing condenser; a reference condenser having a normally fixed capacity; a first source of alternating voltage of constant magnitude; circuit means connecting said measuring condenser to said first source of alternating voltage for producing a current of a first phase which is a function of the capacity of said measuring condenser; a second source of alternating voltage of constant magnitude and of a phase opposite to said first source; circuit means connecting said empty tank balancing condenser to said second source of alternating voltage for producing a current substantially opposite in phase to said current of said first phase and of a magnitude equal to the current flowing through said measuring condenser when empty of fluid; a source of alternating voltage of a variable magnitude and of a phase opposite to said first source; circuit means connecting said reference condenser to said variable source of alternating voltage for producing a variable current, substantially opposite in phase to said current of said first phase, and proportional to the magnitude of said variable source of voltage; means connected between a first output point common to said voltage sources and a second output point common to said measuring condenser, said empty tank balancing condenser, and said reference condenser and responsive to any output voltage resulting from the current of said first phase and the currents of said opposite phase, for adjusting the magnitude of said variable source of voltage in a direction to reduce said output voltage to zero; and means responsive to the adjustment of said variable source of voltage for indicating the quantity of fluid in the associated container, said empty tank capacitor being effective to cause said means for adjusting the magnitude of said variable source of voltage to adjust said variable source to a zero magnitude condition when said measuring condenser is empty of fluid so that the magnitude of said variable source of voltage is always directly proportional to the quantity of fluid in the associated container; a further source of alternating voltage of a variable magnitude and in phase with said first source, means connected between a first output point which is common to the said voltage sources of each of said plurality of networks and is common to said further source of voltage and a second output point connected to the said variable sources of alternating voltage of each of said plurality of networks and to said further source of voltage, said last named means being responsive to a resultant inequality between the voltages of the said variable sources of alternating voltage and said further source of voltage and adjusting the magnitude of said further source of voltage in a direction to reduce said inequality to zero, and means responsive to the adjustment of said further source of voltage for indicating the total quantity of fluid in the plurality of containers.

2. Capacitance type fluid measuring apparatus for indicating the quantity of a dielectric fluid in each of a plurality of containers and for indicating the total quantity of dielectric fluid in the plurality of containers, comprising in combination: a plurality of electrical networks one of which is associated with each container and comprises a measuring condenser having spaced electrodes immersible in the fluid in the container and constructed and arranged with respect to its associated container such that its capacitance is a function of both the quantity and dielectric constant of the fluid in its associated container; an empty tank balancing condenser having a fixed capacitance; a reference condenser having a fixed capacitance; a first source of alternating voltage of constant magnitude having a first terminal connected to a reference potential and having a second terminal with a voltage thereon of a first phase; phase responsive means having a pair of input terminals, a first of which is connected to said reference potential; first circuit means connecting said measuring condenser to the second terminal of said first source of alternating voltage and to the second input terminal of said phase responsive means to cause a first current to flow to the input of said phase responsive means which is of a magnitude which is a function of the capacitance of said measuring condenser; a second source of alternating voltage of constant magnitude having a first terminal connected to said reference potential and having a second terminal with a voltage thereon of a phase opposite to said first phase; second circuit means connecting said empty tank balancing condenser to the second terminal of said second source of alternating voltage and to the second input terminal of said phase responsive means to cause a second current to flow to the input of said phase responsive means which is of a phase opposite to said first current and of a magnitude equal to the current flowing in said first circuit when said measuring condenser is empty of fluid; a third source of alternating voltage of a variable magnitude having a first terminal connected to said reference potential and having a second terminal with a voltage thereon of a phase opposite to said first phase; third circuit means connecting said reference condenser to the second terminal of said third source of alternating voltage and to the second input terminal of said phase responsive means to cause a third current to flow to the input of said phase responsive means which is of a phase opposite to said first current and of a magnitude proportional to the quantity of fluid in the associated container; means including said phase responsive means rsepsonsive to the resultant current of said first, second and third currents for adjusting the magnitude of said third source of voltage in a direction to reduce said resultant current to zero, the magnitude of said third source of voltage thereby being zero when said measuring condenser is empty of fluid, means responsive to the adjustment of said third source of voltage for indicating the quantity of fluid in the associated container; a further source of alternating voltage of a variable magnitude having a first terminal connected to said reference potential and having a second terminal with the voltage thereon of said first phase, further phase responsive means having a pair of input terminals, a first of which is connected to said reference potential, further circuit means connecting the second input terminal of said further phase responsive means to the second terminal of said further source of voltage and to the said second terminal of said third source of voltage of each of said plurality of networks, means including said further phase responsive means responsive to the current flow in said further circuit means for adjusting the magnitude of said further source of voltage in a direction to reduce the current flow in said further circuit means to zero, and means responsive to the adjustment of said further source of voltage for indicating the total quantity of fluid in the plurality of containers.

3. The combination: a plurality of electrical networks for determining the total quantity of a substance in a plurality of containers; each network comprising, a first impedance adapted to have its impedance varied in accordance with the quantity of the substance in one of the containers, a first source of alternating voltage of constant magnitude, first means including said first impedance connected to said first source of voltage for producing an electrical signal having a minimum portion indicative of an empty container and a variable additional portion indicative of the quantity of the substance in the container, a second source of alternating voltage of a constant magnitude and of an opposite phase to said first source of voltage, a second impedance having a fixed value, second means including said second impedance connected to said second source of voltage for producing a constant electrical signal equal in magnitude and opposite in phase to the minimum portion of signal produced by said first means; said first and second means having a common portion such that the signal produced by said second means neutralizes the minimum portion of the signal produced by said first means; a third variable source of alternating voltage of an opposite phase to said first source of voltage, a third impedance having a fixed value, third means including said third impedance connected to said third source of voltage for producing a variable electrical signal; said first and third means having a common portion including signal responsive means responsive to the resultant of said variable portion of the signal produced by said first means and said signal produced by said third means, means including said signal responsive means for varying the magnitude of said third source of voltage such that the signal produced by said third means neutralizes said variable portion of the signal produced by said first means, the magnitude of said third source of voltage then being a direct indication of the quantity of the substance in the one container; a further variable source of voltage in phase with said first source of voltage, a plurality of impedance means, further means including one of said impedance means connected to each of said third sources of voltage of each of said plurality of networks and to said further source of voltage for producing a resultant electrical signal in accordance with the signals derived from said third sources of voltage and the opposing signal derived from said further source of voltage, said further means having further signal responsive means responsive to said resultant signal and including means for varying the magnitude of said further source of voltage such that said resultant signal is reduced substantially to zero, and means responsive to the varying of said further source of voltage for indicating the total quantity of substance in the plurality of containers.

References Cited in the file of this patent

UNITED STATES PATENTS

| | | |
|---|---|---|
| 2,188,628 | Freystedt | Jan. 30, 1940 |
| 2,300,562 | Freystedt | Nov. 3, 1942 |
| 2,357,023 | Reid et al. | Aug. 29, 1944 |
| 2,371,040 | Fisher et al. | Mar. 6, 1945 |
| 2,388,559 | Macintyre | Nov. 6, 1945 |
| 2,406,870 | Vacquier | Sept. 3, 1946 |
| 2,519,416 | Townsend | Aug. 22, 1950 |
| 2,563,280 | Schafer | Aug. 7, 1951 |
| 2,581,085 | Edelman | Jan. 1, 1952 |